UNITED STATES PATENT OFFICE.

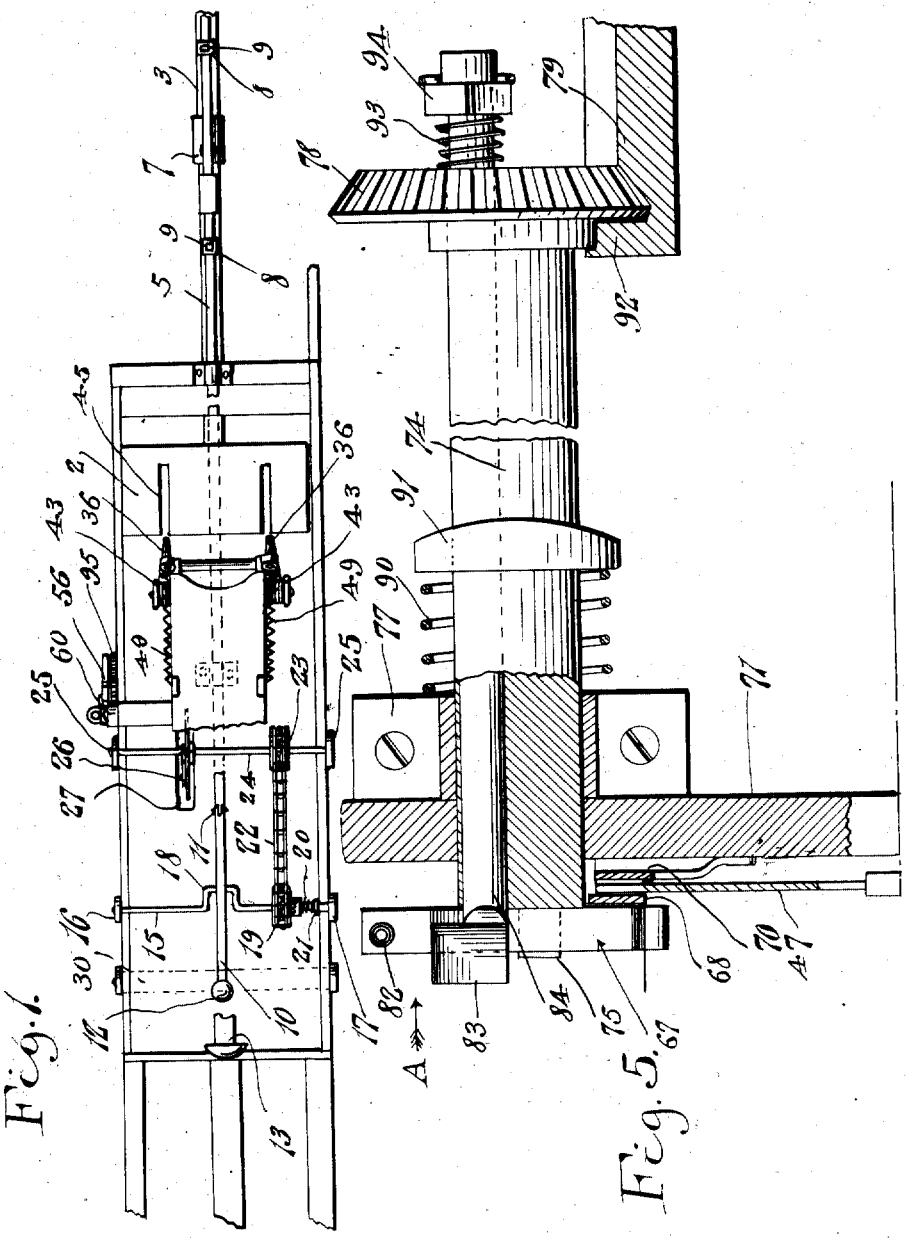

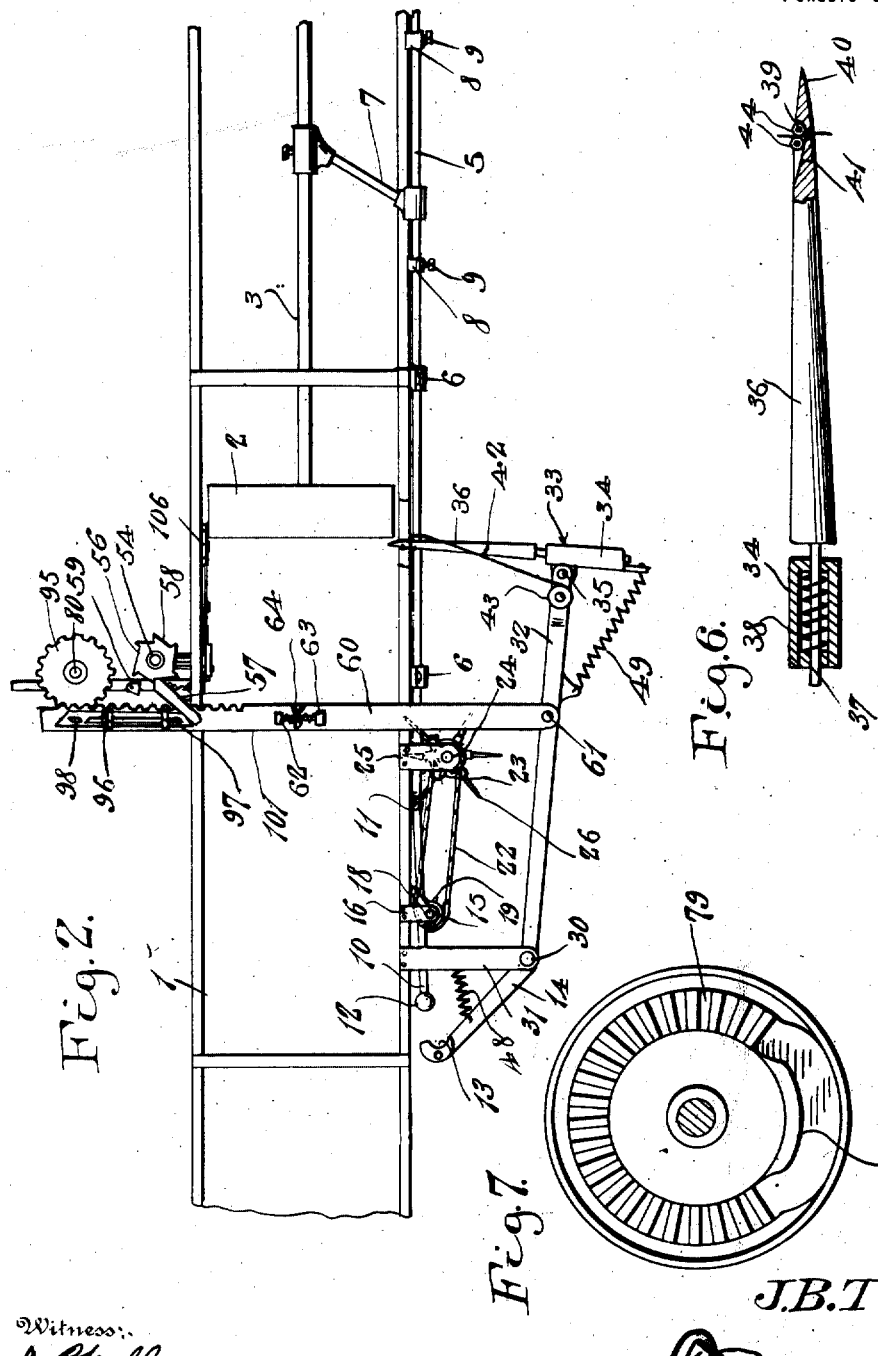

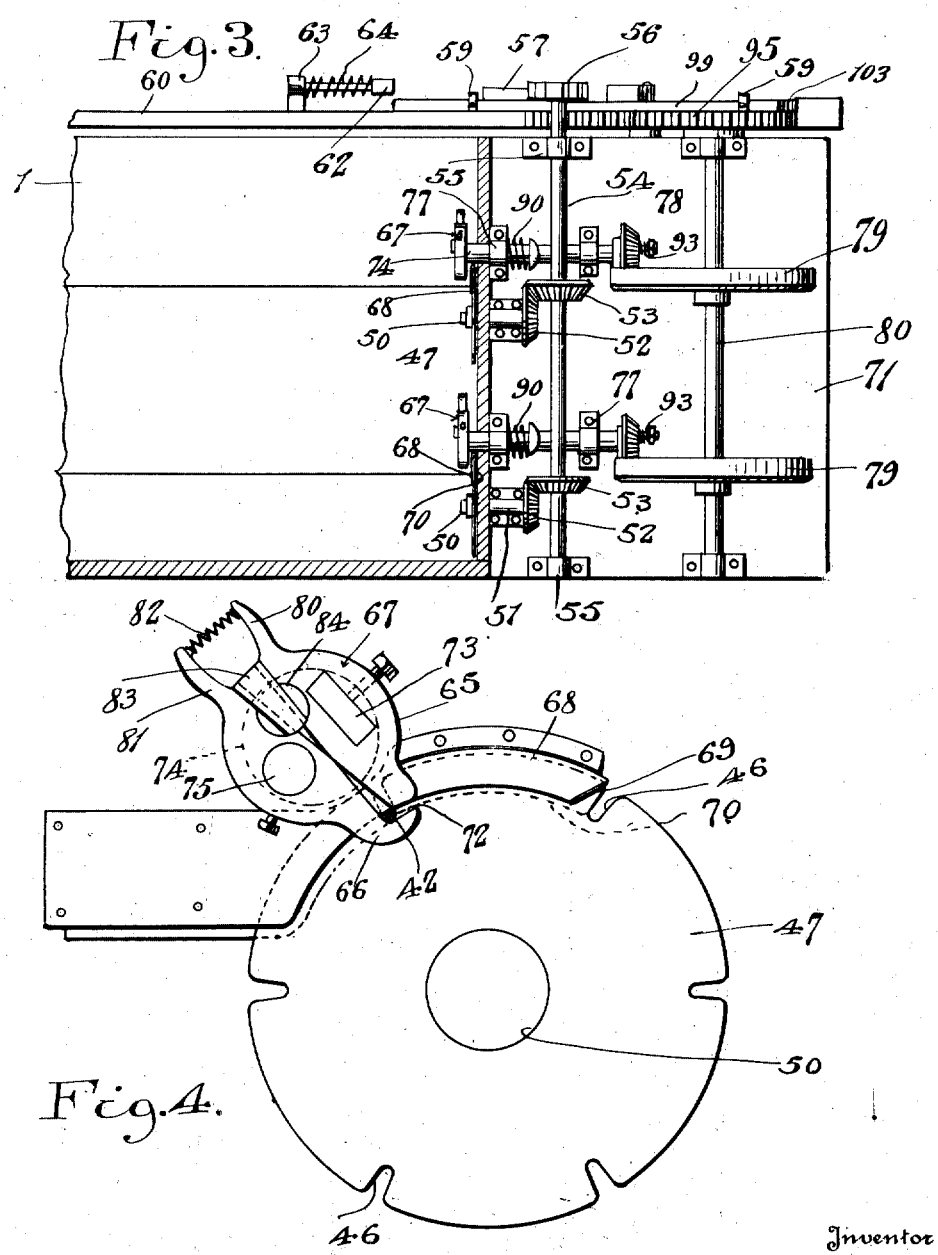

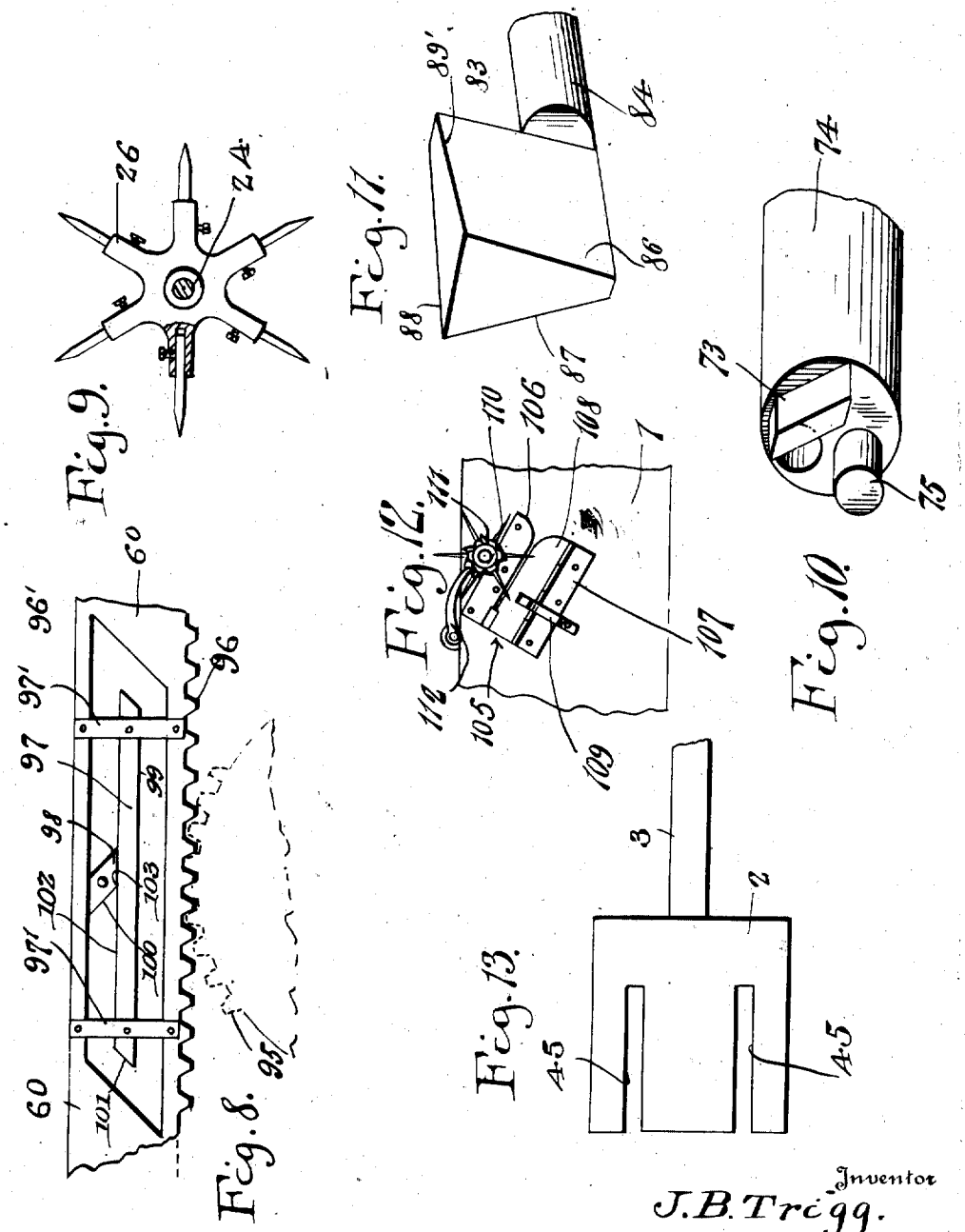

JOHN B. TRIGG, OF JONAH, TEXAS, ASSIGNOR OF ONE-HALF TO WILLIAM E. HILL, OF JONAH, TEXAS.

AUTOMATIC BINDER ATTACHMENT FOR HAY-PRESSES.

1,243,570. Specification of Letters Patent. Patented Oct. 16, 1917.

Application filed October 7, 1916. Serial No. 124,307.

*To all whom it may concern:*

Be it known that I, JOHN B. TRIGG, a citizen of the United States, residing at Jonah, in the county of Williamson and State of Texas, have invented certain new and useful Improvements in Automatic Binder Attachments for Hay-Presses; and I do hereby declare the following to be a full, clear, and exact description of the invention, such as will enable others skilled in the art to which it appertains to make and use the same.

This invention relates to an automatic binder for attachment to hay presses, and the primary object of the invention is to provide a device which is operable, automatically, upon the completing of the formation of a bale of hay within the baling chamber of a hay press for passing the binding wire about the bale of hay, cutting and twisting the ends of the wire, thereby eliminating the necessity of performing this operation manually.

Another object of this invention is to provide an automatic binder as specified which includes a rod operatively connected to the plunger rod which will be moved longitudinally upon movement of the plunger or baling head of a hay baler or press, which rod has a pivoted section formed upon one end of the same, a crank shaft for moving the pivoted section outwardly for engagement with the needle operating lever for pivotally moving the lever upon the forming of the last section of a bale of hay, and a star wheel which is engaged by the hay as it is being pressed into bale formation for regulating the operation of said crank shaft.

Another object of this invention is to provide a needle operating structure which includes a pivotally mounted lever having a socket for receiving one end of the pivoted section of the operating rod by means of which the lever is pivotally moved, which lever has a pair of wire carrying needles attached to its forward end, so that upon operation of the lever the needles will be forced through the baling chamber of an ordinary hay press for feeding the wire about the bale formed therein and to provide means for automatically returning the needles and the lever to their normal positions after a bale has been tied.

A still further object of this invention is to provide a structure for cutting and twisting the ends of the wire, which includes a rotary wire carrying plate provided with a plurality of notches for receiving the wire from the needle and carrying it around to a twister structure, which twister structure includes a rigidly mounted jaw and a pivotally mounted jaw which are normally held in spaced relation for receiving the wire, and to provide means for automatically closing the jaws upon the wire, and rotating the wire twisting member for twisting the ends of the wire after it has been passed about the bale formed in the baling chamber.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a fragmentary side elevation of an ordinary reciprocatory type of hay baler or press showing the invention applied thereto.

Fig. 2 is a top plan view of a part of a hay baler or press illustrating the invention applied thereto.

Fig. 3 is a fragmentary end view illustrating the structure carried by one side of the baling press which includes the wire cutter, twister and the mechanism for operating the wire cutter and twister.

Fig. 4 is an enlarged detail view of the wire twister, wire carrying plate and cutting knife.

Fig. 5 is an enlarged fragmentary view partially in section of the wire twister, guiding plate and the mechanism for operating the twister and guiding plate.

Fig. 6 is a detail view partially in section of one of the wire feeding needles.

Fig. 7 is a detail view of a combined gear and cam used in the operation of the twister.

Fig. 8 is a detail view of the mechanism for rotating the wire twister.

Fig. 9 is a detail view of the star wheel for controlling the operation of the tying or binding mechanism.

Fig. 10 is a detail perspective view of one end of the wire twister operating shaft.

Fig. 11 is a detail perspective view of the wedge which closes the jaws of the wire twister.

Fig. 12 is a detail view of the needle point receiving socket

Fig. 13 is a detail view of the plunger or head of the hay press or baler.

Referring more particularly to the drawings, 1 indicates a hay baler of the ordinary type, which includes a baling chamber, a plunger or pressing head 2, and a plunger rod 3. The improved automatic binder structure which constitutes the invention, is carried by the baling chamber of the hay press and it includes a rod 5, which is slidably carried by suitable bearings 6 which are attached to the outer surface of one side of the hay baler. The rod 6 is connected through the medium of a coupler 7, to the plunger rod 3 of the baler for longitudinal movement of the baler synchronously with the movement of the plunger. Suitable stop collars 8 are adjustably mounted upon the rod 5 and held in place in adjusted positions by the ordinary type of set screws 9.

The rear section 10 of the rod 5 is pivotally connected to the main body portion of the rod as clearly shown at 11, and it has a ball 12 mounted upon its free terminal which ball is adapted for seating in the socket 13 formed on the end of a pivoted lever 14, for rocking the lever 14 as will be hereinafter more fully described. The pivoted section 10 of the rod 5 is normally moved free from engagement with the socket 13, and it is moved outwardly for engagement with the socket upon the forming of the final section of the bale of hay within the baling chamber by the rotation of a crank shaft 15. The crank shaft 15 is supported by suitable bearings 16 and 17, and it has a crank portion 18 formed thereon intermediate of its ends, the wrist or bight portion of which engages the pivoted section 10 of the rod 5 for moving the pivoted section outwardly away from the baler upon the rotation of the crank shaft.

A sprocket 19 is mounted on the crank shaft 15, and it has a coil spring 20 connected to the hub of the same and to a collar 21 which is mounted upon the crank shaft 15. The sprocket 19 is mounted upon the shaft 15, in such a manner that it will rotate the shaft, except when a heavy duty is given the shaft, at which time the spring 20 will permit the sprocket to rotate independently of rotating the shaft 15. This structure is provided for permitting the sprocket 19 to rotate independently of the shaft 15, after the ball 12 has been seated in the socket 14, thereby eliminating the liability of the crank portion 18 forcing the ball 12 out of the socket 13 upon further rotation of the crank shaft 15.

A sprocket chain 22 travels about the sprocket 19 and about a sprocket 23 which is mounted upon a shaft 24. The shaft 24 is rotatably supported by suitable bearings 25, and it has a star wheel 26 mounted thereon, the fingers of which extend through a slot 27 formed in the side of the baling chamber, so that upon each forward stroke of the plunger 2, the star wheel will be rotated a distance equal to the distance between one of the points and the point next thereto. For instance; should the star wheel 26 have six fingers or points formed thereon, it will be rotated one-sixth of a revolution upon each forward stroke of the plunger 2.

The lever 14 is pivotally supported by a suitable rod 30 which is in turn supported by brackets 31 carried by the baler. The lever 14 has an enlarged head 32 formed upon its forward end, which head extends transversely to the lever. The head 32 has a needle structure generically indicated by the numeral 33 carried by each of its ends.

The needle structures 33, which are identical, and only one of which will be hereinafter described, are provided for feeding the baling wire about the bale formed in the chamber.

The needle structure 33 includes a casing 34, which is pivotally connected as shown at 35 to the head 32. A needle proper 36 is provided which has a shank 37. The shank 37 extends into and through the casing 34, and a cushioning coil spring 38 is coiled about the shank 37. One end of the spring is connected to the interior of the casing 34, while the other end of the spring is connected to the shank 37, so as to provide the proper cushioning effect of the movement of the needle. The needle 36 is provided with an eye 39 formed a short distance inwardly from its point 40. A groove or passage way 41 communicates with the eye 39 and is provided for leading the baling wire 42 from the spool 43 into the eye 39 and between a pair of spaced grooved rollers 44 which properly guide the wire and permit it to pass freely through the eye of the needle. The needle 36 is adapted for movement through the baling chamber behind the last section of a bale of hay, straw or the like for passing the wire 42 across the rear end of the bale.

When the pivoted end 10 of the rod 5 is moved outwardly, so that the ball 12 will strike the socket 13, the compressing stroke of the plunger 2 will force the rod 5 rearwardly, and consequently rock the lever 14, which will force the needle 36 through the baling chamber, and through slots 45 formed in the plunger head. The needle 36 carries the baling wire 42 through the baling chamber and feeds the wire into a notch 46 formed in a wire carrying plate 47 which is positioned upon the side of the baling chamber opposite to the side on which the needle normally rests. After the needle has fed the wire 2 to the wire guiding plate 47, the spring 48 will return the lever 14 to its normal position, and the spring 49 will return the needle structure 33 to its normal position. The pivot 35 of the needle structure is provided for permitting of the proper movement of the needle during its movement through the baling chamber.

The plate 47, is provided with a plurality of peripherally spaced notches 46 into which the baling wire is fed by the needle and it is mounted upon a shaft 50 which is supported by a suitable bearing 51. A bevel gear 52 is mounted upon the shaft 50 and it meshes with a bevel gear 53 carried by a shaft 54. The shaft 54 is rotatably supported in any suitable manner by the ordinary type of bearings 55 and it has a ratchet 56 mounted upon one end of the same. A pawl 57 is slidably supported in any suitable manner, and its upper end is provided for engagement with any one of the peripheral teeth 58 of the ratchet 56, for rotating the ratchet one step, the purpose of which will be hereinafter more fully described. A suitable stop 59 is provided for limiting the movement of the pawl 57, and consequently the movement of the ratchet 56.

A bar 60 is pivotally connected as shown at 61 to the lever 14, and it has a pawl striking member 62 carried thereby. The pawl striking member 62 is slidably carried by a suitable bracket 63, and a coil spring 64 is coiled about the shank of the pawl striking member for yieldably supporting the same. When the lever 14 is pivotally moved for feeding the needle structures 33 through the baling chamber, the bar 60 is moved outwardly so that the striker 62 will engage the pawl 57, and rotate the ratchet 56 and consequently the shaft 54 the required distance for rotating the plate 47 a distance equal to the space between two of the wire carrying notches 46, for feeding the wire between the jaws 65 and 66 of the wire twisting structure 67. A knife 68 is provided which has a sharpened edge 69. The edge 69 of the knife structure 68 engages the wire during the rotation of the plate 47 and cuts the same. A spring plate 70 is carried by the supporting board 71 and it engages the end of the wire and securely holds it in proper position within one of the notches 46, until it is engaged between the jaws 65 and 66.

The wire twisting structure generically indicated by the numeral 67 includes a relatively rigid jaw 65 and a pivotally mounted jaw 66 which jaws are constructed for forming a wire receiving mouth 72 which is positioned in the path of the ends of the wire when they are carried about by the wire plate 47. The jaw 65 is rigidly carried by a tenon 73, which tenon is formed upon the end of a shaft 74 which operates the twister structure 67. The jaw 66 is pivotally mounted upon a pin 75 which is formed upon one end of the shaft 74. The shaft 74 is rotatably carried by suitable bearings 77 and it has a bevel gear 78 mounted upon the outer end of the same which bevel gear meshes with a bevel gear 79 carried by a shaft 80.

The jaws 65 and 66 have arms 81 formed thereupon which are connected through the medium of a spring 82, which spring normally holds the jaws spread so that the baling wire may be fed into the mouth 72 of the twister structure. The jaws are closed, at the proper time, by the insertion of a wedge 83 between their facing sides outwardly of the pivot of the jaw 66. The wedge 83 is carried by a shaft 84 which extends longitudinally through the shaft 74. The wedge 83 is peculiarly shaped, as clearly shown in Fig. 11 of the drawings, having both its longitudinal edges and end edges angled for forming a pair of angularly disposed wedge faces. The edges 86 and 97 of the wedge 83 are angled for fitting snugly between a portion of the facing sides of the jaws 65 and 66, and the edges 88 and 89' of the wedge are angled so that when the wedge is moved inwardly in the direction indicated by the arrow $a$ in Fig. 5 of the drawings, the end of the jaw 66 outwardly of its pivot will be forced outwardly from the jaw 65, which will close the mouth 72, causing it to securely clamp the wires positioned therein. The wedge normally rests between the jaws 65 and 66, so that only a very slight movement of the wedge, and consequently the shafts 74 and 84 is necessary for properly closing the mouth 72 of the wire twister structure. The shaft 74 is slidably supported by its bearings 77, and a spring 90 is coiled about the shaft and engages a collar 91 carried by the shaft, and one of the bearings 77 for automatically forcing the shaft in the direction opposite to that indicated by the arrow $a$, after the cam portion 92 of the bevel gear 79 moves out of engagement with the hub of the bevel gear 78. A spring 93 is coiled about one end of the shaft 84 and one end of the spring engages the outer face of the bevel gear 78, while the other end engages a nut 94. The spring 93 is provided for permitting of a yieldable movement of the shaft 84 and the wedge 83, for accommodation to wires of various diameters.

The shaft 80 has a gear 95 mounted upon its upper end. The gear 95 is adapted for meshing engagement with the rack teeth 96 formed upon the edge of the bar 60. The bar 60 is provided with an opening 96' formed therein adjacent its outer ends. A cleat or strip 97 is positioned within the opening 96, and held in place by suitable straps 97'. The strip 97 is adapted for engagement with a reversing diamond 98. Upon the pivotal movement of the lever 14, for feeding the needle through the baling chamber, at which time the bar 60 is moved outwardly, the edge 99 of the strip 97 will ride along the edge 100 of the diamond 98, owing to the respective angles of the end of the cleat 97 facing the angled side of the diamond 98, which will move the bar 60 upon its pivotal point 61 so that the rack teeth 96 will be out of meshing engagement with the gear 95. During the outward movement of the bar 60, the bar will be moved outwardly far enough so that the angled end 101 of the cleat 97 will engage the outer angled end of the diamond 98 and cause the side 102 of the cleat to engage the side 103 of the diamond upon the return stroke of the bar 60, thereby moving the rack teeth 96 into engagement with the gear teeth upon the gears 95, which will rotate the shaft 80, and consequently, through the medium of bevel gears 78 and 79 rotate the shaft 74 and the wire twister structure 67, four revolutions, for effectively twisting the ends of the wires which are positioned in the mouth 72 of the twister structure 67. If it is so desired, the faces of the jaws 65 and 66 which engage the baling wires 42 may be corrugated for obtaining a more firm grip upon the wire than would be possible with smooth face jaws.

In the drawings, an upper and lower set of twisters, wire plates and the companion mechanisms are shown for feeding two wires about a bale of hay, straw or the like formed in the hay baler, but since these structures are identical, only one has been specifically described.

A stop structure 105 is carried by the side of the baling chamber and it is provided for arresting the movement of the needle 36.

The structure 105 include a plate 106 which is attached in any suitable manner to the hay baler, and a second plate 107 which is also rigidly attached to the baling chamber. A plate 108 is connected to the plate 107 through the medium of a bar 109, so that the plate 108 may have a limited movement when necessary for properly engaging the point of the needle 36 between the facing edges of the plates 106 and 108.

A star wheel 110 is rotatably supported alongside the plate 106 and it has a ratchet 111 connected thereto, the teeth of which ratchet are engaged by a pawl 112 which permits the star wheel 110 to rotate in one direction, and prevents it from rotating in an opposite direction. The points of the star wheel 110 are provided for being positioned between the ends of the wires surrounding the bale for holding them properly spaced until they are twisted by the twister structure 67.

In the operation of the improved automatic binder for hay balers; the wire from the needle 36 is stretched across the baling chamber, and its end is seated in one of the notches 46 of the wire plate 47. The spring plate 70 holds the end of the wire firmly within the notch. When the various sections of the bale of hay are forced rearwardly by the plunger 2, the wire is carried rearwardly with the same, being fed from the spool 43 so that it will extend along both sides and the outer end of the bale. The formation of the various sections, rotate the star wheel 26 with a step by step motion as previously described, which gradually rotates the crank shaft 15 through the medium of the sprocket chain 22 and the sprockets 19 and 23, until the last section of the bale is being formed. When the last section is being formed, the star wheel will have rotated the crank shaft 15 sufficiently to cause the crank 18 to move the pivoted section 10 of the rod 5 outwardly so that the ball 12 will be seated in the socket 13. When the ball 12 is seated in the socket 13, the compressing stroke of the plunger 2 will rock the lever 14 upon its pivot 30, and force the needle structure 33 through the baling chamber behind the last section of the bale, and through the slot 45 formed in the plunger head 2. When the needle point is seated in the stop structure 105, the baling wire 42 carried thereby will be positioned in the notch 46 in which the first end of the wire was positioned. During the pivoted stroke of the lever 14 for forcing the needle 33 through the baling chamber, the bar 60 will be forced outwardly, so that the pawl striker 62 will strike the pawl 57 and rotate the ratchet 56. The rotation of the ratchet 56, will in turn rotate the shaft 54 a distance corresponding to the distance of the rotation of the ratchet, which rotation is regulated by the stop 59, so that the shaft 50 will be rotated only far enough to carry the wires 42 which are positioned within the notch 46 of the plate 47 into the mouth 72 of the twister structure 67. When the bar 60 and the lever 14 start their return stroke, the rack teeth 96 will have been pushed into meshing engagement with the gear 95, through the medium of the diamond 98, which will rotate the shaft 80 and move the shaft 74 outwardly, a relatively short distance, for forcing the wedge 83 between the jaws 65 and 66 for closing the mouth of the twister structure and clamping it tightly upon the wires which are carried thereby. The bevel gear 79 is arranged so that the cam structure 92 carried thereby will engage the bevel gear 78 at the proper time for closing the jaws upon the initial rotation of the shaft 80. The further rotation of the shaft 80, by the rotation of the gear 95 will rotate the shaft 74 and consequently the twister structure 67 which is carried thereby, and twist the ends of the wire together, securely fastening them about the bale formed in the baler.

When the needle 36 returns, to its normal position, it will leave the end of the wire cut by the knife 69, and left in the needle, in the notch 46 of the plate 47, and the wire will be held therein by the spring plate 70 so that upon the formation of a new bale, the wire may be carried about both sides and the outer end of the bale, and the foregoing operation repeated.

The points of the star wheel 26 are adjustable as to length, as clearly shown in Fig. 9 of the drawings, so as to insure the proper amount of rotation, upon the forming of different sized bales.

From the foregoing description taken in connection with the accompanying drawings the advantages of construction and of the method of operation of the improved automatic binder attachment for hay presses, will be readily apparent to those skilled in the art to which this invention appertains.

What is claimed is:—

1. The combination with an ordinary hay baler having a baling chamber, a reciprocatory compressing plunger, and a plunger rod, of means for holding one end of the baling wire across the baling chamber whereby the wire will be passed about two sides and one end of the bale upon formation of the same, a lever pivotally supported by said baler, a needle for feeding wire across the remaining end of the bale upon completion of the bale carried by said lever, a rod slidably supported by the baler and operatively connected to said plunger rod, said rod having a pivoted section adapted for engaging said lever for rocking the lever, and means controlled by the formation of a bale in said chamber for moving said pivoted section into a lever engaging position.

2. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally supported by said baler, a needle for feeding the wire across the remaining end of the bale upon completion of the bale carried by said lever, a rod slidably supported by said baler and operatively connected to said plunger rod, said rod having a pivoted section adapted for engaging said lever for rocking the same, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into a lever rocking position.

3. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally supported by said baler, a needle for feeding the wire across the remaining end of the bale upon completion of the bale carried by said lever, a rod slidably supported by said baler and operatively connected to said plunger rod, said rod having a pivoted section adapted for engaging said lever for rocking the same, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into a lever rocking position, said last named means being constructed for permitting said star wheel to rotate independently of said crank shaft upon the application of heavy duty to said crank shaft.

4. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally carried by said baler, a needle for feeding the wire across the remaining end of the bale upon completion of the bale carried by said lever, a rod slidably supported by the baler and operatively connected to said plunger rod, said rod having a pivoted section adapted for engaging said lever for rocking the lever, means controlled by the formation of the bale in said chamber for moving said pivoted section into a lever engaging position, and means for returning said lever to its normal position after the binding of a bale.

5. The combination with an ordinary hay baler having a baling chamber, a reciprocatory compressing plunger and a plunger rod, of means for holding one end of a binding wire across the baling chamber whereby the wire will pass about two sides and one end of the bale upon formation of the same, a lever pivotally supported by said baler, a needle for feeding the wire across the remaining end of the baler upon completion of the bale carried by said lever, a rod slidably supported by the baler and operatively connected to the plunger rod, said rod having a pivoted section adapted for engaging said lever for rocking the same, a crank shaft carried by the said bale, a star wheel positioned so that its points will be engaged by the hay in the baling chamber for rotating the star wheel a part revolution upon the formation of each bale section, means operatively connecting said star wheel and said crank shaft for rotating the crank shaft synchronously with the star wheel for moving the pivoted portion of said rod into a lever rocking position, and means for returning said lever to its normal position after the binding of a bale.

6. The combination with an ordinary hay baler having a reciprocatory plunger, a plunger rod and a baling chamber, of a lever pivotally supported by one side of the baler, a binding wire feeding needle pivotally carried by said lever, a wire carrying plate rotatably carried by said baler opposite to said lever supporting guide, said plate provided with peripheral wire receiving notches, means for holding a wire end in any one of said notches, means operable by said plunger for rocking said lever for forcing said needle through the chamber to pass the wire across the last end of a bale after completing the bale, a twister having a wire receiving mouth carried by said baler, means operable by the rocking of said lever for rotating said wire carrying plate for delivering the wire to said twister after passage of the wire across the last end of the bale, means operable by the rocking of said lever for closing the mouth of said twister and rotating the twister for twisting together the ends of the wire surrounding a bale.

7. The combination with an ordinary hay baler having a reciprocatory plunger, a plunger rod and a baling chamber, of a lever pivotally supported by one side of the baler, a binding wire feeding needle pivotally carried by said lever, a wire carrying plate rotatably carried by said baler opposite to said lever supporting side, said plate provided with peripheral wire receiving notches, means for holding a wire end in any one of said notches, means operable by said plunger for rocking said lever for forcing said needle through the chamber to pass the wire across the last end of a bale after completing the bale, a twister having a wire receiving mouth carried by said baler, means operable by the rocking of said lever for rotating said wire carrying plate for delivering the wire to said twister after passage of the wire across the last end of the bale, means operable by the rocking of said lever for closing the mouth of said twister and rotating the twister for twisting together the ends of the wire surrounding a bale, and means for limiting the rotary movement of said wire carrying plate.

8. The combination with an ordinary hay baler having a reciprocatory plunger, a plunger rod and a baling chamber, of a lever pivotally supported by one side of the baler, a binding wire feeding needle pivotally carried by said lever, a wire-carrying plate rotatably carried by the side of said baler opposite to said lever supporting side, said plate provided with peripheral wire receiving notches, means for gripping the end of the wire and securely holding it in said notch, a rod slidably carried by said baler and operatively connected to said plunger rod, said rod having a pivoted section adapted for movement into engagement with said lever for rocking the lever for forcing said needle through the chamber to pass the wire across the last end of a bale upon the completing of the bale, and means operable by the formation of a bale within said chamber for controlling the pivotal movement of said pivotal section.

9. The combination with an ordinary hay baler having a reciprocatory plunger, a plunger rod and a baling chamber, of a lever pivotally supported by one side of the baler, a binding wire feeding needle pivotally carried by said lever, a wire carrying plate rotatably carried by the side of said baler opposite to said lever supporting side, said plate provided with peripheral wire receiving notches, means for gripping the end of the wire and securely holding it in said notch, a rod slidably carried by said baler and operatively connected to said plunger rod, said rod having a pivoted section adapted for movement into engagement with said lever for rocking the lever for forcing said needle through the chamber to pass the wire across the last end of a bale upon the completing of the bale, and means operable by the formation of a bale within said chamber for controlling the pivotal movement of said pivotal section, means for returning said lever to its normal position after the binding of the bale, means for cutting the wire after passing it across the last end of the bale, and means for twisting together the ends of the binding wire surrounding the bale.

10. The combination with an ordinary hay baler having a receiving plunger, a plunger rod and a baling chamber, of a lever pivotally supported by one side of the baler, a binding wire feeding needle pivotally carried by said lever, a wire carrying plate rotatably carried by the side of said baler opposite to said lever supporting side, said plate provided with peripheral wire receiving notches, means for engaging said wire and holding it firmly in one of said notches, a rod slidably carried by said baler and operatively connected to said plunger rod, said rod provided with a pivotal section, means controllable by the formation of a bale within the baling chamber for moving said pivoted section into a lever engaging position for rocking said lever for forcing said needle through the chamber to pass the wire across the last end of a bale upon the completing of the bale, a twister carried by said baler, means operable by the rocking of said lever for rotating said wire carrying plate for delivering the wire to said twister after the passage of the wire across the last end of the bale.

11. The combination with an ordinary hay baler having a receiving plunger, a plunger rod and a baling chamber, of a lever pivotally supported by one side of the baler, a binding wire feeding needle pivotally carried by said lever, a wire carrying plate rotatably carried by the side of said baler opposite to said lever supporting side, said plate provided with peripheral wire receiving notches, means for engaging said wire and holding it firmly in one of said notches, a rod slidably carried by said baler and operatively connected to said plunger rod, said rod provided with a pivotal section, means controllable by the formation of a bale within the baling chamber for moving said pivoted section into a lever engaging position for rocking said lever for forcing said needle through the chamber to pass the wire across the last end of a bale upon the completing of the bale, a twister carried by said baler, means operable by the rocking of said lever for rotating said wire carrying plate for delivering the wire to said twister after the passage of the wire across the last end of the bale, a cutter for cutting said wire prior to twisting and means for returning said lever to its normal position after the binding of a bale.

12. In an automatic binder for hay balers, a wire twister including a shaft, a jaw rigidly carried by said shaft, a second jaw pivotally carried by said shaft, said jaws arranged to form a wire receiving mouth, means for normally holding said mouth open, a second shaft carried by said first named shaft, a wedge carried by said second named shaft and engaging said jaws, and means for moving said shaft longitudinally for moving said wedge to rock said pivoted jaw for closing said mouth.

13. In an automatic binder for hay balers, a wire twister including a shaft, a jaw rigidly carried by said shaft, a second jaw pivotally carried by said shaft, said jaws arranged to form a wire receiving mouth, means for normally holding said mouth open, a second shaft carried by said first named shaft, a wedge carried by said second shaft and engaging said jaws, means for moving said shafts longitudinally for moving said wedge to rock said pivoted jaw to close said mouth, a rotary wire carrying plate provided with a plurality of peripheral wire receiving notches, a spring plate for engagement with a wire for holding it in one of said notches, and means for rotating said wire carrying plate for delivering a wire carried by one of its notches into said twister mouth prior to the closing of the mouth.

14. The combination with an ordinary hay baler having a baling chamber, a reciprocatory compressing plunger, and a plunger rod, of a lever pivotally supported by said baler, a needle for feeding a wire across the chamber pivotally carried by one end of said lever, a rod slidably supported by said baler and operatively connected to said plunger rod, said rod having a pivoted section, and means controlled by the formation of a bale within said chamber for moving said pivoted section into a lever engaging position.

15. The combination with an ordinary hay baler having a baling chamber, a reciprocatory compressing plunger, and a plunger rod, of means for holding one end of a baling wire across the baling chamber whereby the wire will be passed about two sides and one end of a bale upon formation of the same, a lever pivotally supported by said baler, a needle for feeding a wire across the remaining end of a bale upon completion of the bale carried by said lever, a rod slidably supported by the baler and operatively connected to said plunger rod, said rod having a pivoted section adapted for engaging said lever for rocking the lever, means controlled by the formation of a bale in said chamber for moving said pivoted section into a lever engaging position, and means for cutting the wire fed across the chamber by said needle.

16. The combination with an ordinary hay baler having a baling chamber, a reciprocatory compressing plunger, and a plunger rod, of means for holding one end of a baling wire across the baling chamber whereby the wire will be passed about two sides and one end of a bale upon formation of the same, a lever pivotally supported by said baler, a needle for feeding a wire across the remaining end of a bale upon completion of the bale carried by said lever, a rod slidably supported by the baler and operatively connected to said plunger rod, said rod having a pivoted section adapted for engaging said lever for rocking the lever, means controlled by the formation of a bale in said chamber for moving said pivoted section into a lever engaging position, means for cutting the wire fed across the chamber by said needle, and means for twisting together the first named end of the wire and the end formed by said cutting means.

17. The combination with an ordinary hay baler having a baling chamber, a reciprocatory compressing plunger, and a plunger rod, of means for holding one end of a baling wire across the baling chamber whereby the wire will be passed about two sides and one end of a bale upon formation of the same, a lever pivotally supported by said baler, a needle for feeding a wire across the remaining end of a bale upon completion of the bale carried by said lever, a rod slidably supported by the baler and operatively connected to said plunger rod, said rod having a pivoted section adapted for engaging said lever for rocking the lever, means controlled by the formation of a bale in said chamber for moving said pivoted section into a lever engaging position, means for cutting the wire fed across the chamber by said needle, means for twisting together the first named end of the wire and the end formed by said cutting means, and means for returning said lever and needle to their normal positions after the cutting of said wire.

18. The combination with an ordinary hay baler having a baling chamber, a reciprocatory compressing plunger, and a plunger rod, of means for holding one end of a baling wire across the baling chamber whereby the wire will be passed about two sides and one end of a bale upon formation of the same, a lever pivotally supported by said baler, a needle for feeding a wire across the remaining end of a bale upon completion of the bale carried by said lever, a rod slidably supported by the baler and operatively connected to said plunger rod, said rod having a pivoted section adapted for engaging said lever for rocking the lever, means controlled by the formation of a bale in said chamber for moving said pivoted section into a lever engaging position, means for cutting the wire fed across the chamber by said needle, means for twisting together the first named end of the wire and the end formed by said cutting means, means for returning said lever and needle to their normal positions after the cutting of said wire, said wire twisting means operated by the return movement of said lever to its normal position.

19. The combination with an ordinary hay baler having a baling chamber, a reciprocatory compressing plunger, and a plunger rod, of a lever pivotally supported by said baler, a needle for feeding wire across the chamber pivotally carried by one end of said lever, a rod slidably supported by the baler and operatively connected to said plunger rod, said rod having a pivoted section, means controlled by the formation of a bale within said chamber for moving said pivoted section into a lever engaging position, a wire twister carried by said baler for receiving the end of the wire fed across the chamber by said needle, and means for operating said twister.

20. The combination with an ordinary hay baler having a baling chamber, a reciprocatory compressing plunger, and a plunger rod, of a lever pivotally supported by said baler, a needle for feeding the wire across the chamber pivotally carried by one end of said lever, a rod slidably supported by the baler and operatively connected to said plunger rod, said rod having a pivoted section, means controlled by the formation of a bale within said chamber for moving said pivoted section into a lever engaging position, said rod adapted to rock said lever for forcing said needle through said baling chamber upon longitudinal movement of the rod, means for returning said lever to its normal position, a wire twister carried by said baler for receiving the end of the wire fed across the chamber by said needle, said wire twisting means operated by the return movement of said lever to its normal position.

21. The combination with an ordinary hay baler having a baling chamber, a reciprocatory compressing plunger and a plunger rod, of a lever pivotally supported by said baler, a needle for feeding a wire across the chamber pivotally carried by one end of said lever, a rod slidably supported by the baler and operatively connected to said plunger rod, said rod having a pivoted section adapted for engaging said lever for rocking the same, a crank shaft carried by said baler, a star wheel positioned so its points will be engaged by the hay in the baler for rotating the star wheel a part revolution upon the formation of each bale section, means operatively connecting said star wheel and said crank shaft for rotating the crank shaft synchronously with the star wheel for moving the pivoted section of said rod into a lever engaging and rocking position.

22. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally carried by said baler, a needle for feeding the wire across the remaining end of the bale upon the completion of the bale carried by said lever, a rod slidably supported by said baler and operatively connected to said plunger rod, said rod having a pivoted section adapted for engaging said lever for rocking the same, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into a lever engaging and rocking position, means for cutting the wire fed across the chamber by said needle, and means for twisting together the first named end of the wire and the end formed by said cutting means.

23. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally carried by said baler, a needle for feeding the wire across the remaining end of the bale upon the completion of the bale carried by said lever, a rod slidably supported by said baler and operatively connected to said plunger rod, said rod having a pivoted section adapted for engaging said lever for rocking the same, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into a lever engaging and rocking position, means for cutting the wire fed across the chamber by said needle, means for twisting together the first named end of the wire and the end formed by said cutting means, and means for returning said lever and needle to their normal positions after the cutting of said wire.

24. The combination with an ordinary hay baler having a baling chamber, a reciprocatory compressing plunger and a plunger rod, of means for holding one end of a binding wire across the baling chamber whereby the wire will be passed about two sides and one end of the baler upon formation of the same, a lever pivotally carried by said baler, a needle for feeding the wire across the remaining end of the bale upon the completion of the bale carried by said lever, a rod slidably supported by said baler and operatively connected to said plunger rod, said rod having a pivoted section adapted for engaging said lever for rocking the same, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into a lever engaging and rocking position, means for cutting the wire fed across the chamber by said needle, means for twisting together the first named end of the wire and the end formed by said cutting means, means for returning said lever and needle to their normal positions after the cutting of said wire, said wire twisting means operated by the return movement of said lever to its normal position.

25. The combination with an ordinary hay baler, of a needle for passing a baling wire across the chamber of said baler, means for operating said needle including a rod slidably supported by said baler and operatively connected to the plunger rod of the baler, said rod having a pivoted section normally lying in an inoperative position, a crank shaft carried by said baler, a star wheel positioned so that its points will be engaged by the hay in the baler for rotating the star wheel a part revolution upon the formation of each bale section, means operatively connecting said star wheel and said crank shaft for rotating the crank shaft synchronously with the star wheel for moving the pivoted portion of said rod into an operative position.

In testimony whereof I affix my signature in presence of two witnesses.

JOHN B. TRIGG.

Witnesses:
W. E. HILL,
C. H. EMERSON.